(12) United States Patent
Morishita et al.

(10) Patent No.: US 7,718,588 B2
(45) Date of Patent: May 18, 2010

(54) LUBRICATING OIL ADDITIVE CONTAINING ACRYLIC POLYMER AND LUBRICATING OIL COMPOSITIONS

(75) Inventors: Yoshihiro Morishita, Tsukuba (JP);
Noboru Higashida, Kashima-gun (JP);
Hidetaka Oonuma, Kashima-gun (JP);
Kenichi Hamada, Tsukuba (JP);
Kazushige Ishiura, Chuo-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 495 days.

(21) Appl. No.: 11/632,481

(22) PCT Filed: Jul. 14, 2005

(86) PCT No.: PCT/JP2005/013076

§ 371 (c)(1),
(2), (4) Date: Apr. 3, 2007

(87) PCT Pub. No.: WO2006/009083

PCT Pub. Date: Jan. 26, 2006

(65) Prior Publication Data

US 2008/0058234 A1   Mar. 6, 2008

(30) Foreign Application Priority Data

Jul. 16, 2004   (JP) ............................. 2004-210819

(51) Int. Cl.
*C10M 145/14* (2006.01)
*C08F 220/18* (2006.01)

(52) U.S. Cl. .................. 508/469; 526/329.5; 526/329.7

(58) Field of Classification Search .................. 508/469; 526/329.5, 329.7
See application file for complete search history.

(56) References Cited

U.S. PATENT DOCUMENTS

| | | | | |
|---|---|---|---|---|
| 5,188,770 A | * | 2/1993 | Pennewiss | 508/471 |
| 5,834,408 A | * | 11/1998 | Mishra et al. | 508/469 |
| 6,329,480 B1 | * | 12/2001 | Uchiumi et al. | 526/173 |
| 6,403,745 B1 | * | 6/2002 | Scherer et al. | 526/319 |
| 2004/0034183 A1 | * | 2/2004 | Kato et al. | 526/318 |
| 2005/0085592 A1 | * | 4/2005 | Taniguchi et al. | 525/242 |
| 2006/0185903 A1 | * | 8/2006 | Schmidt et al. | 175/65 |
| 2006/0189490 A1 | * | 8/2006 | Dardin et al. | 508/469 |
| 2007/0082827 A1 | * | 4/2007 | Schmidt et al. | 508/469 |
| 2008/0146475 A1 | * | 6/2008 | Mueller et al. | 508/469 |

FOREIGN PATENT DOCUMENTS

| | | |
|---|---|---|
| JP | 11 286520 | 10/1999 |
| JP | 11 335432 | 12/1999 |
| JP | 2003 048931 | 2/2003 |
| JP | 2003 515632 | 5/2003 |
| JP | 2003 515633 | 5/2003 |
| JP | 2003 516430 | 5/2003 |

* cited by examiner

*Primary Examiner*—Ellen M McAvoy
(74) *Attorney, Agent, or Firm*—Oblon, Spivak, McClelland, Maier & Neustadt, L.L.P.

(57) ABSTRACT

A lubricating oil additive containing at least one acrylic block copolymer having a weight-average molecular weight of 10,000 to 1,000,000 and a molecular weight distribution [ratio of weight-average molecular weight (Mw) to number-average molecular weight (Mn), i.e., Mw/Mn ratio] of 1.5 or below; and lubricating oil compositions containing the additive. The lubricating oil additive exhibits a thickening effect higher than those of conventional acrylic lubricating oil additives and can improve the viscosity index of lubricating oil even when added in a small amount. Further, the additive can also improve the low-temperature characteristics, flow characteristics, and shear stability. The lubricating oil compositions enable energy saving and can lengthen the lifetime of lubricating oil and reduce the load on the global environment.

10 Claims, No Drawings

LUBRICATING OIL ADDITIVE CONTAINING ACRYLIC POLYMER AND LUBRICATING OIL COMPOSITIONS

TECHNICAL FIELD

The present invention relates to a lubricating oil additive that: has high thickening effect and excellent viscosity index improving capability with the addition of a small amount; and comprises an acrylic block copolymer having a narrow molecular weight distribution. Further, the present invention relates to a lubricating oil composition containing the lubricating oil additive.

BACKGROUND ART

In recent years, from the viewpoint of global environmental conservation, energy saving with a lubricating oil and the extended service life of a lubricating oil are important problems. In order to solve the problems, it is essential to improve the performance including the viscosity index improving capability, the low-temperature viscosity characteristics, the pour point depressing capability, the shear stability, and others of a lubricating oil additive containing a polymer and being added to a lubricating oil.

Lubricating oil additives containing polymers are classified through the molecular structures of the polymers. For example, they are classified into an acrylic lubricating oil additive, an olefinic lubricating oil additive, an isobutylenic lubricating oil additive, a styrene diene copolymeric lubricating oil additive, and others. Among those, the acrylic lubricating oil additive is excellent in viscosity index improving capability, low-temperature viscosity characteristics, and pour point depressing capability, and hence is widely used for an engine oil (for a gasoline engine or a diesel engine), a drive line oil [a gear oil (a manual transmission oil, a differential oil, or the like), an automatic transmission oil (ATF (Automatic Transmission Fluid), CVTF (Continuously Variable Transmission Fluid), or the like), or the like], a hydraulic oil (a power steering oil, a shock absorber oil, or the like), or the like.

As an acrylic polymer used for an acrylic lubricating oil additive, an acrylic polymer that is synthesized mainly by a radical polymerization method and has a wide molecular weight distribution has heretofore been known. For example, in a polymer having such a wide molecular weight distribution that the molecular weight distribution is 2.2 to 3.4 (refer to Patent Reference 1), the proportion of the high molecular weight polymer is high and the macromolecular chains are likely to be cut by shearing in comparison with a similar polymer having a narrow molecular weight distribution. The problems have therefore been that the shear stability is low and the service life of a lubricating oil is short. Further, although the shear stability is improved by using a polymer having a low molecular weight in some cases, in such a case the thickening effect deteriorates and it has been necessary to increase the addition amount of the polymer.

In order to solve the problems, a lubricating oil additive comprising an acrylic polymer and having a narrow molecular weight distribution is studied. The examples are as follows:

(1) a viscosity index improver comprising an acrylic polymer having a narrow molecular weight distribution, the viscosity index improver being produced by a radical polymerization method of using a specific chain transfer agent (refer to Patent Reference 2);

(2) a lubricating oil additive comprising an astrally branched acrylic polymer having a narrow molecular weight distribution, the lubricating oil additive being produced by anionic polymerization (refer to Patent Reference 3); and (3) a pour point depressant comprising an acrylic polymer having a narrow molecular weight distribution, the pour point depressant being produced by anionic polymerization (refer to Patent Reference 4).

Patent Reference 1: U.S. Pat. No. 6,271,184
Patent Reference 2: JP-A No. 48987/1997
Patent Reference 3: U.S. Pat. No. 6,013,735
Patent Reference 4: U.S. Pat. No. 5,834,408

In the case of the above item (1), evaluation is made on the viscosity index improver comprising an acrylic random copolymer having a molecular weight distribution of 1.4 to 2.0. However, the effect of reducing the addition amount required for obtaining the same dynamic viscosity is insufficient.

Further, in the case of the above item (2), the use of an acrylic star polymer having a molecular weight distribution of 1.3 to 1.8 as a lubricating oil composition is described. However, the degree of the improvement of the viscosity index is not obvious and the above problems are not solved.

Furthermore, in the case of the above item (3), an example wherein an acrylic copolymer having a molecular weight distribution of about 1.2 to 1.4 is used as a pour point depressant is described. However, the performance is not satisfactory.

DISCLOSURE OF THE INVENTION

Problem to be Solved by the Invention

In view of the above situation, an object of the present invention is to provide a novel acrylic lubricating oil additive that can exhibit high thickening effect and high viscosity index improving capability with the addition of a small amount in comparison with a conventional acrylic lubricating oil additive. Further, another object of the present invention is to provide a lubricating oil composition containing the novel acrylic lubricating oil additive.

Means for Solving the Problem

The present inventors have earnestly studied in order to solve the above problems. As a result, the present inventors have: found that it is possible to improve a viscosity index with a small addition amount when an acrylic polymer having a weight-average molecular weight in a specific range and a specific narrow molecular weight distribution is used as a lubricating oil additive; and established the present invention.

That is, the present invention is a lubricating oil additive containing at least one kind of an acrylic block copolymer having a weight-average molecular weight of 10,000 to 1,000,000 and a molecular weight distribution (ratio ($M_w/M_n$)) of a weight-average molecular weight ($M_w$) to a number-average molecular weight ($M_n$)) of 1.5 or below.

Further, the present invention is a lubricating oil composition containing the above lubricating oil additive.

Effect of the Invention

A lubricating oil additive according to the present invention: has high thickening effect in comparison with a conventional acrylic lubricating oil additive; can improve a viscosity index with the addition of a small amount; and moreover can improve low-temperature characteristics, flow characteristics, and shear stability. Further, by using a lubricating oil composition containing the above lubricating oil additive according to the present invention, it is possible to: save energy with the lubricating oil; extend the service life of the lubricating oil; and reduce the load on global environment.

Best Mode for Carrying out the Invention

The present invention is hereunder explained in detail. Note that, in the present description, methacrylic acid ester and acrylic acid ester are generically referred to as "(meth) acrylic acid ester" occasionally.

An acrylic block copolymer used in the present invention is a block copolymer having plural polymer blocks mainly comprising a methacrylic acid alkyl ester unit and/or an acrylic acid alkyl ester unit.

Examples of acrylic block copolymers used in the present invention are block copolymers of: poly (methyl methacrylate)-b-poly(lauryl methacrylate); poly(methyl methacrylate)-b-poly(2-ethylhexyl acrylate); poly(methyl methacrylate)-b-poly(lauryl methacrylate)-b-poly(methyl methacrylate); poly(methyl methacrylate)-b-poly(2-ethylhexyl acrylate)-b-poly(methyl methacrylate); poly(methyl methacrylate)-b-poly(2-ethylhexyl acrylate)-b-poly(lauryl methacrylate); and the like.

The weight-average molecular weight of an acrylic block copolymer is in the range of 10,000 to 1,000,000, and preferably 20,000 to 900,000. The number-average molecular weight thereof is preferably in the range of 10,000 to 1,000,000, more preferably 20,000 to 600,000, and still more preferably 20,000 to 300,000. When a weight-average molecular weight and a number-average molecular weight are in above ranges, the advantage is that a viscosity index improves.

The molecular weight distribution (the ratio (Mw/Mn) of a weight-average molecular weight (Mw) to a number-average molecular weight (Mn)) of an acrylic block copolymer used in the present invention is 1.5 or below, preferably 1.3 or below, and more preferably 1.2 or below. When a molecular weight distribution is in an above range, the advantages are that thickening effect and a viscosity index improve.

It is preferable, from the viewpoint of improving a viscosity index, that an acrylic block copolymer is a block copolymer having at least one structure selected from among the structures represented by the general expressions $(A-B)_a$, $(A-B)_b-A$, and $(B-A)_c-B$ (in the expressions, A represents a polymer block comprising a (meth)acrylic acid alkyl ester unit having a $C_{1-3}$ alkyl group, B represents a polymer block comprising a (meth)acrylic acid alkyl ester unit having a $C_{4-30}$ alkyl group, and a, b, and c represent integers of 1 to 10, which may take either an identical value or different values).

Examples of such (meth)acrylic acid alkyl ester having a $C_{1-3}$ alkyl group are the mixtures comprising one or more kinds of: methyl methacrylate; ethyl methacrylate; isopropyl methacrylate; n-propyl methacrylate; methyl acrylate; ethyl acrylate; isopropyl acrylate; n-propyl acrylate; and the like. Among those, methyl methacrylate and methyl acrylate are preferable and methyl methacrylate is more preferable.

Examples of such (meth)acrylic acid alkyl ester having a $C_{4-30}$ alkyl group are the mixtures comprising one or more kinds of: n-butyl methacrylate; isobutyl methacrylate; sec-butyl methacrylate; t-butyl methacrylate; n-hexyl methacrylate; cyclohexyl methacrylate; 2-ethylhexyl methacrylate; dodecyl methacrylate; lauryl methacrylate; stearyl methacrylate; pentadecyl methacrylate; hexadecyl methacrylate; n-butyl acrylate; isobutyl acrylate; sec-butyl acrylate; t-butyl acrylate; n-hexyl acrylate; cyclohexyl acrylate; 2-ethylhexyl acrylate; lauryl acrylate; tridecyl acrylate; stearyl acrylate; pentadecyl acrylate; hexadecyl acrylate; and the like. Among those, 2-ethylhexyl methacrylate, lauryl methacrylate, tridecyl methacrylate, 2-ethylhexy acrylate, lauryl acrylate, and tridecyl acrylate are preferable and 2-ethylhexy acrylate, lauryl acrylate, and tridecyl acrylate are more preferable.

Examples of block copolymers represented by the general expressions $(A-B)_a$, $(A-B)_b-A$, and $(B-A)_c-B$ are: poly(methyl methacrylate)-b-poly(2-ethylhexyl methacrylate); poly (methyl methacrylate)-b-poly(lauryl methacrylate); poly(methyl methacrylate)-b-poly(n-butyl acrylate); poly(methyl methacrylate)-b-poly(2-ethylhexyl acrylate); poly(methyl methacrylate)-b-poly(2-ethylhexyl methacrylate)-b-poly (methyl methacrylate); poly(methyl methacrylate)-b-poly (lauryl methacrylate)-b-poly(methyl methacrylate); poly(methyl methacrylate)-b-poly(n-butyl acrylate)-b-poly(methyl methacrylate); poly(methyl methacrylate)-b-poly(2-ethylhexyl acrylate)-b-poly(methyl methacrylate); poly(2-ethylhexyl methacrylate)-b-poly(methyl methacrylate)-b-poly(2-ethylhexyl methacrylate); poly(lauryl methacrylate)-b-poly (methyl methacrylate)-b-poly(lauryl methacrylate); poly(n-butyl acrylate)-b-poly(methyl methacrylate)-b-poly(n-butyl acrylate); poly(2-ethylhexyl acrylate)-b-poly(methyl methacrylate)-b-poly(2-ethylhexyl acrylate); and the like. In particular, it is preferable that the polymer block represented by A is a polymer block comprising a methacrylic acid alkyl ester unit and the polymer block represented by B is a polymer block comprising an acrylic acid alkyl ester unit since shear stability is excellent when the block copolymer is added to a lubricating oil and used.

The polymer block represented by A may contain (meth) acrylic acid alkyl ester having a $C_{4-30}$ alkyl group that is the same component as the polymer block represented by B as long as the proportion is small (the proportion of 20 mass % or less in the polymer block) in the range not harmful to the effects of the present invention.

Likewise, the polymer block represented by B may contain (meth)acrylic acid alkyl ester having a $C_{1-3}$ alkyl group that is the same component as the polymer block represented by A as long as the proportion is small (the proportion of 20 mass % or less in the polymer block) in the range not harmful to the effects of the present invention.

Further, an acrylic block copolymer used in the present invention may contain: (meth)acrylic acid such as methacrylic acid, acrylic acid, and the like; (meth)acrylic acid ester having an ether structure such as 2-methoxyethyl methacrylate, 2-(2-methoxyethoxy)ethyl methacrylate, 2-methoxyethyl acrylate, 2-(2-methoxyethoxy)ethyl acrylate, and the like; (meth)acrylic acid ester having an amine structure such as 2-(dimethylamino)ethyl methacrylate, 2-(dimethylamino) ethyl acrylate, and the like; (meth)acrylic acid ester having an ether structure and an amine structure such as 2-(4-morpholinyl)ethyl methacrylate, 2-(4-morpholinyl)ethyl acrylate, and the like; and the like as long as the proportion is small (the proportion of 20 mass % or less in the polymer block) in the range not harmful to the effects of the present invention. Among those, the (meth)acrylic acid ester having an ether structure, the (meth)acrylic acid ester having an amine structure, and the (meth)acrylic acid ester having an ether structure and an amine structure are preferably used for the purpose of the dispersion of sludge.

Further, the mass ratio A/B of the total mass of the polymer block represented by A to the total mass of the polymer block represented by B is preferably 1/99 to 40/60, more preferably 2/98 to 30/70, and still more preferably 5/95 to 25/75. When the mass ratio is in an above range, the particular advantages are that the polymer block dissolves uniformly in a lubricating oil and a viscosity index is improved with a small amount.

The number-average molecular weight of the polymer block represented by A is preferably 2,000 to 300,000, more preferably 2,000 to 200,000, and still more preferably 3,000 to 100,000. Further, the number-average molecular weight of the polymer block represented by B is preferably 2,000 to 700,000, more preferably 2,000 to 500,000, and still more preferably 3,000 to 200,000.

It is preferable to select a (meth)acrylic acid alkyl ester unit as a constituent so that, in an acrylic block copolymer, the polymer block represented by A may have higher lipophobicity than the polymer block represented by B and the polymer block represented by B may have higher lipophilicity than the polymer block represented by A. By having such a structure, it is possible to increase the solubility in a lubricating oil and exhibit high thickening effect even with the addition of a small amount.

Further, in a block copolymer represented by the general expressions $(A-B)_a$, $(A-B)_b-A$, and $(B-A)_c-B$, A that is a lipophobic block agglomerates in a lubricating oil under some temperature and concentration conditions. For example, at a low temperature, A agglomerates in a lubricating oil, a polymer forms a secondary structure of a micelle shape or the like, and thickening function lowers. In contrast, as the temperature rises, the agglomeration of A is released, a macromolecular chain lengthens and expands, and the thickening function intensifies. By utilizing such a feature of the present invention that the thickening effect of a polymer varies in accordance with a temperature, it is possible to: prevent the lowering of the viscosity of a lubricating oil caused by temperature rise; and obtain a lubricating oil composition having a high viscosity index and a good temperature-viscosity characteristic.

A method for producing an acrylic block copolymer used in the present invention is not particularly limited as long as a polymer that satisfies the conditions on a chemical structure stipulated in the present invention can be obtained, and a method conforming to a known method can be adopted. In general, as a method of obtaining a polymer having a narrow molecular weight distribution, a method of subjecting a monomer as a constituent unit to living polymerization is adopted. Examples of such methods of living polymerization are: a method of polymerizing a monomer by using an organic rare earth metal complex as a polymerization initiator (refer to JP-A No. 93060/1994); a method of anionically polymerizing a monomer by using an organic alkali metal compound as a polymerization initiator in the presence of salt of mineral acid such as salt of an alkali metal or an alkali earth metal (refer to U.S. Pat. No. 5,264,527); a method of anionically polymerizing a monomer by using an organic alkali metal compound as a polymerization initiator in the presence of an organic aluminum compound (refer to U.S. Pat. No. 6,329, 480); an atom transfer radical polymerization method (ATRP) (refer to Macromol. Chem. Phys. 201, 1108-1114 (2000)); and the like.

Among the above production methods, in the case of the anionic polymerization method or the atom transfer radical polymerization method, it is possible to produce an acrylic block copolymer having a narrower molecular weight distribution. For that reason, an acrylic block copolymer preferably used in the present invention is an acrylic polymer obtained by the anionic polymerization method or the atom transfer radical polymerization method.

Further, among the above production methods, in the case of the method of anionically polymerizing a monomer in the presence of an organic aluminum compound, there are the advantages that: a polymer having a narrower molecular weight distribution can be produced not at a very low temperature but at a relatively high temperature; the amount of a remaining monomer is small; moreover the molecular structure becomes highly syndiotactic; and the degree of the improvement of the viscosity index of a lubricating oil increases when a produced polymer is used as a lubricating oil additive. For that reason, an acrylic block copolymer more preferably used in the present invention is an acrylic block copolymer obtained by the anionic polymerization method in the presence of an organic aluminum compound.

As such an anionic polymerization method in the presence of an organic aluminum compound for example, it is possible to adopt a method of polymerizing (meth)acrylic acid alkyl ester under the existence of an organolithium compound and an organic aluminum compound represented by the following general expression: $AlR^1R^2R^3$ (in the expression, each of $R^1$, $R^2$, and $R^3$ represents individually an alkyl group that may have a substituent group, a cycloalkyl group that may have a substituent group, an aryl group that may have a substituent group, an aralkyl group that may have a substituent group, an alkoxyl group that may have a substituent group, or an aryloxy group or N,N-disubstituted amino group that may have a substituent group, or $R^1$ represents any one of the above groups and $R^2$ and $R^3$ represent aryleneoxy group that may have a substituent group together), if needed, by further using in the reaction system: ether such as dimethyl ether, dimethoxyethane, diethoxyethane, and 12-crown-4; and nitrogen-containing compounds such as triethylamine, N,N, N',N'-tetramethylethylenediamine, N,N,N',N'',N''-pentamethyldiethylenetriamine, 1,1,4,7,10,10-hexamethyltriethylenetetramine, pyridine, 2,2'-dipyridyl, and the like.

Examples of the above organolithium compounds are: alkyl lithium and alkyl dilithium such as methyl lithium, ethyl lithium, n-propyl lithium, isopropyl lithium, n-butyl lithium, sec-butyl lithium, isobutyl lithium, tert-butyl lithium, n-pentyl lithium, n-hexyl lithium, tetramethylene dilithium, pentamethylene dilithium, hexamethylene dilithium, and the like; aryl lithium and alyl dilithium such as phenyl lithium, m-tolyl lithium, p-tolyl lithium, xylyl lithium, lithium naphthalene, and the like; aralkyl lithium and aralkyl dilithium such as benzyl lithium, diphenylmethyl lithium, trityl lithium, 1,1-diphenyl-3-methylpentyl lithium, α-methylstyryl lithium, dilithium produced through the reaction between diisopropenyl benzene and butyl lithium, and the like; lithium amide such as lithium dimethylamide, lithium diethylamide, lithium diisopropylamide, and the like; lithium alkoxide such as methoxy lithium, ethoxy lithium, n-propoxy lithium, isopropoxy lithium, n-butoxy lithium, sec-butoxy lithium, tert-butoxy lithium, pentyloxy lithium, hexyloxy lithium, heptyloxy lithium, octyloxy lithium, phenoxy lithium, 4-methylphenoxy lithium, benzyloxy lithium, 4-methylbenzyloxy lithium, and the like; and the like.

Further, examples of the organic aluminum compounds represented by the above general expression are: trialkyl aluminum such as trimethyl aluminum, triethyl aluminum, tri-n-butyl aluminum, tri-s-butyl aluminum, tri-t-butyl aluminum, triisobutyl aluminum, tri-n-hexyl aluminum, tri-n-octyl aluminum, tri-2-ethylhexyl aluminum, triphenyl aluminum, and the like; dialkylphenoxy aluminum such as dimethyl (2,6-di-tert-butyl-4-methylphenoxy) aluminum, dimethyl (2,6-di-tert-butylphenoxy) aluminum, diethyl (2,6-di-tert-butyl-4-methylphenoxy) aluminum, diethyl (2,6-di-tert-butylphenoxy) aluminum, diisobutyl (2,6-di-tert-butyl-4-methylphenoxy) aluminum, diisobutyl (2,6-di-tert-butylphenoxy) aluminum, di-n-octyl (2,6-di-tert-butyl-4-methylphenoxy) aluminum, di-n-octyl (2,6-di-tert-butylphenoxy) aluminum, and the like; alkyldiphenoxy aluminum such as methyl-bis-(2,6-di-tert-butyl-4-methylphenoxy) aluminum, methyl-bis- (2,6-di-tert-butylphenoxy) aluminum, ethyl [2,2'-methylene-bis-(4-methyl-6-tert-butylphenoxy)] aluminum, ethyl-bis-(2,6-di-tert-butyl-4-methylphenoxy) aluminum, ethyl-bis-(2,6-di-tert-butylphenoxy) aluminum, ethyl [2,2'-methylene-bis-(4-methyl-6-tert-butylphenoxy)] aluminum, isobutyl-bis-(2,6-di-tert-butyl-4-methylphenoxy) aluminum, isobutyl-bis-(2,6-di-tert-butylphenoxy) aluminum, isobutyl [2,2'-methylene-bis-(4-methyl-6-tert-butylphenoxy)] aluminum, n-octyl-bis-(2,6-di-tert-butyl-4-methylphenoxy) aluminum, n-octyl-bis-(2,6-di-tert-butylphenoxy) aluminum, n-octyl [2,2'-methylene-bis-(4-methyl-6-tert-butylphenoxy)] aluminum, and the like; alkoxydiphenoxy aluminum such as methoxy-bis-(2,6-di-tert-butyl-4-methylphenoxy) aluminum, methoxy-bis-(2,6-di-tert-butylphenoxy) aluminum, methoxy [2,2'-methylene-bis-(4-methyl-6-tert-butylphenoxy)] aluminum, ethoxy-bis-(2,6-di-tert-butyl-4-methylphenoxy) aluminum, ethoxy-bis-(2,6-di-tert-butylphenoxy) aluminum, ethoxy [2,2'-methylene-bis-(4-methyl-6-tert-butylphenoxy)] aluminum, isopropoxy-bis-(2,6-di-tert-butyl-4-methylphenoxy) aluminum, isopropoxy-bis-(2,6-di-tert-butylphenoxy) aluminum, isopropoxy[2,2'-methylene-bis-(4-methyl-6-tert-butylphenoxy)] aluminum, tert-butoxy-bis-(2,6-di-tert-butyl-4-methylphenoxy) aluminum, tert-butoxy-bis-(2,6-di-tert-butylphenoxy) aluminum, tert-butoxy [2,2'-methylene-bis-(4-methyl-6-tert-butylphenoxy)] aluminum, and the like; triphenoxy aluminum such as tris-(2,6-di-tert-butyl-4-methylphenoxy) aluminum, tris-(2,6-diphenylphenoxy) aluminum, and the like; and the like. Among those organic aluminum compounds, isobutyl-bis-(2,6-di-tert-butyl-4-methylphenoxy) aluminum, isobutyl-bis-(2,6-di-tert-butylphenoxy) aluminum, isobutyl [2,2'-methylene-bis-(4-methyl-6-tert-butylphenoxy)] aluminum, and the like are particularly preferable from the viewpoint of the degree of living in polymerization, the easiness of handling, and the like.

As the atom transfer radical polymerization method, there is a method for polymerizing a monomer in the presence of a transition metal compound and a nitrogen-containing compound by using an organohalide or a halogenated sulfonyl compound as a polymerization initiator.

As the initiator used in the atom transfer radical polymerization method, an organohalide is preferably used and a compound having a structure formed by combining a halogen atom with a benzylic position or the α position of a carbonyl group can be used.

As concrete examples of the organohalides, bromomethyl benzene, 1-bromoethyl benzene, 1-bromoisopropyl benzene, bis-(bromomethyl)benzene, bis-(1-bromoethyl)benzene, bis-(1-bromoisopropyl)benzene, 2-bromomethyl propionate, 2-bromoethyl propionate, 2-bromobutyl propionate, 2-bromomethyl isobutyrate, 2-bromoethyl isobutyrate, 2-bromobutyl isobutyrate, bromomethyl diphenylacetate, bromoethyl diphenylacetate, bromobutyl diphenylacetate, 2,3-dibromodimethyl succinate, 2,3-dibromodiethyl succinate, 2,3-dibromodibutyl succinate, 2,4-dibromodimethyl glutarate, 2,4-dibromodiethyl glutarate, 2,4-dibromodibutyl glutarate, 2,5-dibromodimethyl adipate, 2,5-dibromodiethyl adipate, 2,5-dibromodibutyl adipate, 2,6-dibromodimethyl pimelate, 2,6-dibromodiethyl pimelate, 2,6-dibromodibutyl pimelate, 2,7-dibromodimethyl suberate, 2,7-dibromodiethyl suberate, 2,7-dibromodibutyl suberate, chloromethyl benzene, 1-chloroethyl benzene, 1-chloroisopropyl benzene, bis-(chloromethyl)benzene, bis-(1-chloroethyl)benzene, bis-(1-chloroisopropyl)benzene, 2-chloromethyl propionate, 2-chloroethyl propionate, 2-chlorobutyl propionate, 2-chloromethyl isobutyrate, 2-chloroethyl isobutyrate, 2-chlorobutyl isobutyrate, chloromethyl diphenylacetate, chloroethyl diphenylacetate, chlorobutyl diphenylacetate, 2,3-dichlorodimethyl succinate, 2,3-dichlorodiethyl succinate, 2,3-dichlorodibutyl succinate, 2,4-dichlorodimethyl glutarate, 2,4-dichlorodiethyl glutarate, 2,4-dichlorodibutyl glutarate, 2,5-dichlorodimethyl adipate, 2,5-dichlorodiethyl adipate, 2,5-dichlorodibutyl adipate, 2,6-dichlorodimethyl pimelate, 2,6-dichlorodiethyl pimelate, 2,6-dichlorodibutyl pimelate, 2,7-dichlorodimethyl suberate, 2,7-dichlorodiethyl suberate, 2,7-dichlorodibutyl suberate, iodomethyl benzene, 1-iodoethyl benzene, 1-iodoisopropyl benzene, bis-(iodomethyl)benzene, bis-(1-iodoethyl)benzene, bis-(1-iodoisopropyl)benzene, 2-iodomethyl propionate, 2-iodoethyl propionate, 2-iodobutyl propionate, 2-iodomethyl isobutyrate, 2-iodoethyl isobutyrate, 2-iodobutyl isobutyrate, iodomethyl diphenylacetate, iodoethyl diphenylacetate, iodobutyl diphenylacetate, 2,3-diiododimethyl succinate, 2,3-diiododiethyl succinate, 2,3-diiododibutyl succinate, 2,4-diiododimethyl glutarate, 2,4-diiododiethyl glutarate, 2,4-diiododibutyl glutarate, 2,5-diiododimethyl adipate, 2,5-diiododiethyl adipate, 2,5-diiododibutyl adipate, 2,6-diiododimethyl pimelate, 2,6-diiododiethyl pimelate, 2,6-diiododibutyl pimelate, 2,7-diiododimethyl suberate, 2,7-diiododiethyl suberate, 2,7-diiododibutyl suberate, and the like. Among those, bromomethyl benzene, 1-bromoethyl benzene, 1-bromoisopropyl benzene, 2-bromoethyl propionate, 2-bromoethyl isobutyrate, bis-(bromomethyl)benzene, 2,5-dibromodiethyl adipate, and 2,6-dibromodiethyl pimelate are preferably used from the viewpoint of the availability of the material.

As the transition metal compounds used as co-catalysts in the atom transfer radical polymerization, there are the compounds of copper, ruthenium, iron, nickel, and the like. Among those, a copper compound is preferably used from the viewpoint of the reaction speed and the suppression of side reaction. As the copper compounds, there are cuprous chloride, cuprous bromide, cuprous iodide, cuprous cyanide, cuprous oxide, cuprous hyperchloride, and the like. Among those, cuprous chloride and cuprous bromide are preferably used from the viewpoint of the reaction speed and the suppression of side reaction.

As nitrogen-containing compounds, there are 2,2'-bipyridyl, N,N,N',N'-tetramethyldiethylenetriamine, N,N,N',N",N"-pentamethyldiethylenetriamine, 1,1,4,7,10,10-hexamethyltriethylenetetramine, and the like. Among those, N,N,N',N",N"-pentamethyldiethylenetriamine and 1,1,4,7,10,10-hexamethyltriethylenetetramine are preferably used from the viewpoint of the reaction speed and the suppression of side reaction.

In a lubricating oil additive according to the present invention, a solution of a block copolymer obtained through polymerization in a solvent can be used as a lubricating oil additive composition. Further, it is also possible to dilute the solution with a diluent such as a solvent after polymerization and then use the diluted solution as a lubricating oil additive composition. A lubricating oil additive composition diluted with a solvent is preferably used since it can be easily dissolved when added to a lubricating oil.

As the diluents, solvents of aliphatic series such as hexane, heptane, cyclohexane, octane, decalin, kerosene, and the like; solvents of aromatic series such as toluene, xylene, ethylbenzene, trimethylbenzene, ethyltoluene, and the like; mineral oils such as oils of a paraffin type, a naphthene type, a paraffin-naphthene mixture type, and the like; synthetic lubricating oils such as a hydrocarbon oil, a halo-substituted hydrocarbon oil, and the like; and the like can be used. Among those diluents, mineral oils and synthetic lubricating oils are preferably used, and mineral oils are particularly preferable.

If necessary, a lubricating oil additive according to the present invention may be: further blended with arbitrary components such as various kinds of viscosity index improvers, pour point depressants, anti-oxidizing agents, cleaning agents, dispersers, antioxidants, oiliness improvers, friction wear adjustors, extreme pressure agents, antifoaming agents, demulsifiers, corrosion inhibitors, and the like; and then used as a lubricating oil additive composition.

A lubricating oil composition containing a lubricating oil additive according to the present invention can be properly used for an engine oil (for a gasoline engine or a diesel engine), a drive line oil [a gear oil (a manual transmission oil, a differential oil, or the like), an automatic transmission oil (ATF (Automatic Transmission Fluid) CVTF (Continuously Variable Transmission Fluid), or the like), or the like], a hydraulic oil (a power steering oil, a shock absorber oil, or the like), or the like. Among those applications, preferable applications are a drive line oil and a hydraulic oil, and more preferably a drive line oil.

The content of a block copolymer used for the present invention in relation to the total mass of a lubricating oil composition containing a lubricating oil additive according to the present invention is preferably 0.1 to 50 mass %, more preferably 1 to 40 mass %, and still more preferably 1 to 30 mass %. When the content is in an above range, outstandingly excellent viscosity index improving effect is exhibited.

EXAMPLES

The present invention is hereunder explained more concretely on the basis of examples, but the present invention is not limited to the following examples. Meanwhile, the chemicals used in the following examples and comparative examples are dried and refined by an ordinary method and then used.

Further, the measuring apparatuses used for the analysis of a polymer and the method of evaluating a polymer as a lubricating oil additive in the following examples and comparative examples are described below.

(1) Measurement of a number-average molecular weight (Mn), a weight-average molecular weight (Mw), and a molecular weight distribution (Mw/Mn) by gel permeation chromatography (GPC)
Apparatus: gel permeation chromatograph (HLC-8020) made by Tosoh Corporation
Column: GMHXL, G4000HXL and G5000HXL of TSKgel, made by Tosoh Corporation, were connected in series.
Eluent: tetrahydrofuran
Eluent flow rate: 1.0 ml/min.
Column temperature: 40° C.
Calibration curve: made with standard polystyrene.

(2) Measurement of the content of each copolymer component in a copolymer by proton nuclear magnetic resonance ($^1$H-NMR) spectroscopy
Apparatus: nuclear magnetic resonance apparatus (JNM-LA400) made by JEOL Ltd.
Solvent: bichloroform (3) Measurement of conversion ratio of a charged monomer by gas chromatography (GC)
Apparatus: gas chromatograph GC-14A made by Shimadzu Corporation
Column: INERT CAP 1 (df=0.4 µm, inner diameter 0.25 mm×length 60 m) made by GL Sciences Inc.
Analysis conditions: injection 300° C., detector 300° C., 60° C. (retained for 0 min.)→5° C./min.→100° C. (retained for 0 min.)→15° C./min.→300° C. (retained for 2 min.)

(4) Conditioning of lubricating oil composition

A lubricating oil composition was conditioned by mixing a polymer and a mineral oil (COSMO NEUTRAL 100) of indicated masses for 24 hours at 120° C. under a nitrogen atmosphere.

(5) Solubility Test
With regard to each of lubricating oil compositions conditioned by the method shown in the above item (4), the existence of insolubles was observed visually and by mesh filtering, and a case where no insolubles were observed was evaluated as "good" and a case where insolubles were observed was evaluated as "bad."

(6) Measurement of dynamic viscosity and computation of viscosity index
Conducted in conformity with JIS K2283.

(7) Viscosity measurement
Viscosity at 0° C. was measured with an E-type viscometer Visconic EM made by TOKIMEC Inc. under the circulation of a cold solvent at 0° C. Then, viscosity at 40° C. and 70° C., was measured with an E-type viscometer Visconic EL made by TOKIMEC Inc. under the circulation of warm water at 40° C. and 70° C.

(8) Specific viscosity
A specific viscosity was calculated and obtained with the expression:

Specific viscosity=[(viscosity of polymer added oil)−(viscosity of base oil)]/(viscosity of base oil).

That means that the thickening effect intensifies as the specific viscosity increases.

(9) E value
An E value is the ratio of specific values and was calculated and obtained with the expressions:

$E$ value(40° C./0° C.)=(specific viscosity at 40° C.)/(specific viscosity at 0° C.); and $E$ value(70° C./40° C.)=(specific viscosity at 70° C.)/(specific viscosity at 40° C.).

That means that, as an E value (a high temperature/a low temperature) increases, the temperature dependency of viscosity is more alleviated, and it can be said that the viscosity index improving capability is enhanced.

Synthesis Example 1

Synthesis of Polymer A1 (Diblock Copolymer)

A three-way stopcock was attached to a 100-mL Schlenk-type glass reaction vessel, the interior of the vessel was replaced with nitrogen, thereafter toluene 43.3 g, 1,1,4,7,10,10-hexamethyltriethylenetetramine 0.066 g (0.286 mmol), and a toluene solution 1.06 g containing isobutyl-bis-(2,6-di-t-butyl-4-methylphenoxy) aluminum 0.708 mmol was added at room temperature, and further the mixed solution 0.14 g of cyclohexane and n-hexane containing sec-butyllithium 0.237 mmol was added. Successively, methyl methacrylate 1.73 g was added thereto. The reacted solution was firstly colored yellow but turned to colorless after stirred for 10 minutes at room temperature. At the moment, the reacted solution 0.5 g for analysis was sampled in a sampling container containing a small amount of methanol. As a result of GC measurement of the reacted solution, the conversion ratio of the methyl methacrylate was 100%. Successively, lauryl methacrylate 11.6 g was added in the reaction vessel. The reacted solution was firstly colored yellow but turned to colorless after stirred for 20 minutes at room temperature. Successively, methanol 0.5 g was added in the reaction vessel and the polymerization reaction was stopped. As a result of GC measurement of the reacted solution, the conversion ratio of the lauryl methacrylate was 100%. The reacted solution obtained was poured into a beaker containing 500 mL of methanol and a precipitate was obtained. The precipitate was dried in a vacuum for 24 hours at 60° C. and a rice cake shaped polymer 13.3 g was obtained. The product was referred to as "polymer A1."

As a result of subjecting the reacted solution sampled in the middle of the reaction and the polymer A1 to $^1$H-NMR measurement and GPC measurement, it was clarified that: the finally obtained polymer A1 was a diblock copolymer of poly(methyl methacrylate)-b-poly(lauryl methacrylate); Mn of the poly(methyl methacrylate) block was 7,810, Mw thereof was 8,890, and thus Mw/Mn thereof was 1.14; then Mn of the diblock copolymer was 46,700, Mw thereof was 51,000, and thus Mw/Mn thereof was 1.09; and the proportion of each of the blocks was poly(methyl methacrylate) (14.4 mass %)-b-poly(lauryl methacrylate) (85.6 mass %)

Synthesis Example 2

Synthesis of Polymer A2 (Diblock Copolymer)

A three-way stopcock was attached to a 100-mL Schlenk-type glass reaction vessel, the interior of the vessel was replaced with nitrogen, thereafter toluene 34.7 g, 1,1,4,7,10,10-hexamethyltriethylenetetramine 0.047 g (0.20 mmol), and a toluene solution 0.767 g containing isobutyl-bis-(2,6-di-t-butyl-4-methylphenoxy) aluminum 0.514 mmol was added at room temperature, and further the mixed solution 0.10 g of cyclohexane and n-hexane containing sec-butyllithium 0.171 mmol was added. Successively, methyl methacrylate 0.63 g was added thereto. The reacted solution was firstly colored yellow but turned to colorless after stirred for 10 minutes at room temperature. At the moment, the reacted solution 0.5 g for analysis was sampled in a sampling container containing a small amount of methanol. As a result of GC measurement of the reacted solution, the conversion ratio of the methyl methacrylate was 100%. Successively, after the reacted solution was cooled to −20° C., 2-ethylhexyl acrylate 9.0 g was dripped in 10 minutes. Successively, after two minutes after the end of the dripping, methanol 0.5 g was added in the reaction vessel and the polymerization reaction was stopped. As a result of GC measurement of the reacted solution, the conversion ratio of the 2-ethylhexyl acrylate was 100%. The reacted solution obtained was poured into a beaker containing 500 mL of methanol and a precipitate was obtained. The precipitate was dried in a vacuum for 24 hours at 60° C. and a rice cake shaped polymer 9.6 g was obtained. The product was referred to as "polymer A2."

As a result of subjecting the reacted solution sampled in the middle of the reaction and the polymer A2 to $^1$H-NMR measurement and GPC measurement, it was clarified that: the finally obtained polymer A2 was a diblock copolymer of poly(methyl methacrylate)-b-poly(2-ethylhexyl acrylate); Mn of the poly(methyl methacrylate) block was 3,740, Mw thereof was 4,170, and thus Mw/Mn thereof was 1.11; then Mn of the diblock copolymer was 55,600, Mw thereof was 58,800, and thus Mw/Mn thereof was 1.06; and the proportion of each of the blocks was poly(methyl methacrylate) (5.9 mass %)-b-poly(2-ethylhexyl acrylate) (94.1 mass %).

Synthesis Example 3

Synthesis of Polymer A3 (Diblock Copolymer)

A three-way stopcock was attached to a 100-mL Schlenk-type glass reaction vessel, the interior of the vessel was replaced with nitrogen, thereafter toluene 43.3 g, 1,1,4,7,10,10-hexamethyltriethylenetetramine 0.063 g (0.272 mmol), and a toluene solution 1.01 g containing isobutyl-bis-(2,6-di-t-butyl-4-methylphenoxy) aluminum 0.679 mmol was added at room temperature, and further the mixed solution 0.13 g of cyclohexane and n-hexane containing sec-butyllithium 0.226 mmol was added. Successively, methyl methacrylate 2.66 g was added thereto. The reacted solution was firstly colored yellow but turned to colorless after stirred for 10 minutes at room temperature. At the moment, the reacted solution 0.5 g for analysis was sampled in a sampling container containing a small amount of methanol. As a result of GC measurement of the reacted solution, the conversion ratio of the methyl methacrylate was 100%. Successively, lauryl methacrylate 10.6 g was added in the reaction vessel. The reacted solution was firstly colored yellow but turned to colorless after stirred for 20 minutes at room temperature. Successively, methanol 0.5 g was added in the reaction vessel and the polymerization reaction was stopped. As a result of GC measurement of the reacted solution, the conversion ratio of the lauryl methacrylate was 100%. The reacted solution obtained was poured into a beaker containing 500 mL of methanol and a precipitate was obtained. The precipitate was dried in a vacuum for 24 hours at 60° C. and a rice cake shaped polymer 13.2 g was obtained. The product was referred to as "polymer A3."

As a result of subjecting the reacted solution sampled in the middle of the reaction and the polymer A3 to $^1$H-NMR measurement and GPC measurement, it was clarified that: the finally obtained polymer A3 was a diblock copolymer of poly(methyl methacrylate)-b-poly(lauryl methacrylate); Mn of the poly(methyl methacrylate) block was 13,200, Mw thereof was 14,600, and thus Mw/Mn thereof was 1.11; then Mn of the diblock copolymer was 54,400, Mw thereof was 61,400, and thus Mw/Mn thereof was 1.13; and the proportion of each of the blocks was poly(methyl methacrylate) (21.3 mass %)-b-poly(lauryl methacrylate) (78.7 mass %).

Synthesis Example 4

Synthesis of Polymer A4 (Diblock Copolymer)

A three-way stopcock was attached to a 100-mL Schlenk-type glass reaction vessel, the interior of the vessel was replaced with nitrogen, thereafter toluene 43.3 g, 1,1,4,7,10,10-hexamethyltriethylenetetramine 0.030 g (0.132 mmol), and a toluene solution 0.739 g containing isobutyl-bis-(2,6-di-t-butyl-4-methylphenoxy) aluminum 0.495 mmol was added at room temperature, and further the mixed solution 0.065 g of cyclohexane and n-hexane containing sec-butyllithium 0.11 mmol was added. Successively, methyl methacrylate 1.61 g was added thereto. The reacted solution was firstly colored yellow but turned to colorless after stirred for 10 minutes at room temperature. At the moment, the reacted solution 0.5 g for analysis was sampled in a sampling container containing a small amount of methanol. As a result of GC measurement of the reacted solution, the conversion ratio of the methyl methacrylate was 100%. Successively, lauryl methacrylate 10.8 g was added in the reaction vessel. The reacted solution was firstly colored yellow but turned to colorless after stirred for 20 minutes at room temperature. Successively, methanol 0.5 g was added in the reaction vessel and the polymerization reaction was stopped. As a result of GC measurement of the reacted solution, the conversion ratio of the lauryl methacrylate was 100%. The reacted solution obtained was poured into a beaker containing 500 mL of methanol and a precipitate was obtained. The precipitate was dried in a vacuum for 24 hours at 60° C. and a rice cake shaped polymer 12.4 g was obtained. The product was referred to as "polymer A4."

As a result of subjecting the reacted solution sampled in the middle of the reaction and the polymer A4 to $^1$H-NMR measurement and GPC measurement, it was clarified that: the finally obtained polymer A4 was a diblock copolymer of poly(methyl methacrylate)-b-poly(lauryl methacrylate); Mn of the poly(methyl methacrylate) block was 16,700, Mw thereof was 18,100, and thus Mw/Mn thereof was 1.13; then Mn of the diblock copolymer was 96,500, Mw thereof was 115,000, and thus Mw/Mn thereof was 1.19; and the proportion of each of the blocks was poly(methyl methacrylate) (14.3 mass %)-b-poly(lauryl methacrylate) (85.7 mass %)

Synthesis Example 5

Synthesis of Polymer A5 (Triblock Copolymer)

A three-way stopcock was attached to a 100-mL Schlenk-type glass reaction vessel, the interior of the vessel was replaced with nitrogen, thereafter toluene 43.3 g, 1,1,4,7,10,10-hexamethyltriethylenetetramine 0.062 g (0.269 mmol), and a toluene solution 1.17 g containing isobutyl-bis-(2,6-di-t-butyl-4-methylphenoxy) aluminum 0.784 mmol was added at room temperature, and further the mixed solution 0.131 g of cyclohexane and n-hexane containing sec-butyllithium 0.224 mmol was added. Successively, methyl methacrylate 0.819 g was added thereto. The reacted solution was firstly colored yellow but turned to colorless after stirred for 10 minutes at room temperature. At the moment, the reacted solution 0.5 g for analysis was sampled in a sampling container containing a small amount of methanol. As a result of GC measurement of the reacted solution, the conversion ratio of the methyl methacrylate was 100%. Successively, lauryl methacrylate 11.0 g was added in the reaction vessel. The reacted solution was firstly colored yellow but turned to colorless after stirred for 20 minutes at room temperature. At the moment, the reacted solution 0.5 g for analysis was sampled in a sampling container containing a small amount of methanol. As a result of GC measurement of the reacted solution, the conversion ratio of the lauryl methacrylate was 100%. Successively, methyl methacrylate 0.819 g was added thereto, methanol 0.5 g was added after the reacted solution was stirred for 30 minutes, and the polymerization reaction was stopped. As a result of GC measurement of the reacted solution, the conversion ratio of the methyl methacrylate was 100%. The reacted solution obtained was poured into a beaker containing 500 mL of methanol and a precipitate was obtained. The precipitate was dried in a vacuum for 24 hours at 60° C. and a rice cake shaped polymer 12.6 g was obtained. The product was referred to as "polymer A5."

As a result of subjecting the reacted solution sampled in the middle of the reaction and the polymer A5 to $^1$H-NMR measurement and GPC measurement, it was clarified that: the finally obtained polymer A5 was a triblock copolymer of poly(methyl methacrylate)-b-poly(lauryl methacrylate)-b-poly(methyl methacrylate); Mn of the poly(methyl methacrylate) block sampled in the middle of the reaction was 4,400, Mw thereof was 5,000, and thus Mw/Mn thereof was 1.13; then Mn of poly(methyl methacrylate)-b-poly(lauryl methacrylate) sampled in the middle of the reaction was 55,400, Mw thereof was 58,700, and thus Mw/Mn thereof was 1.06; Mn of the triblock copolymer finally obtained was 60,600, Mw thereof was 63,300, and thus Mw/Mn thereof was 1.05; and the proportion of each of the blocks was poly(methyl methacrylate) (6.8 mass %)-b-poly(lauryl methacrylate) (86.4 mass %)-b-poly(methyl methacrylate) (6.8 mass %).

Comparative Synthesis Example 1

Synthesis of Polymer B1 (Random Copolymer)

A three-way stopcock was attached to a 300-mL three-necked flask-type glass reaction vessel, the interior of the vessel was replaced with nitrogen, and thereafter toluene 87.0 g, methyl methacrylate 6.15 g, lauryl methacrylate 81.7 g, 2,2'-azobis-isobutyronitrile 0.189 g (1.15 mmol), and 1-dodecanethiol 0.345 g (1.71 mmol) were added at room temperature. Successively, the reacted solution in the reaction vessel was bubbled for 30 minutes with nitrogen, and thereafter stirred and polymerized for 24 hours at 60° C. The reacted solution obtained was poured into a beaker containing 1 L of methanol and a precipitate was obtained. The precipitate was dried in a vacuum for 24 hours at 60° C. and a liquid product 82.4 g was obtained. The product was referred to as "polymer B1."

As a result of subjecting the polymer B1 to $^1$H-NMR measurement and GPC measurement, it was clarified that: the polymer B1 was a random copolymer of poly(methyl methacrylate-co-poly lauryl methacrylate); Mn thereof was 34,500, Mw thereof was 59,400, and thus Mw/Mn thereof was 1.72; and the ratio of the methyl methacrylate unit to the lauryl methacrylate unit was 6.2 to 93.8 (mass %).

Comparative Synthesis Example 2

Synthesis of Polymer B2 (Random Copolymer)

A three-way stopcock was attached to a 300-mL three-necked flask-type glass reaction vessel, the interior of the vessel was replaced with nitrogen, and thereafter toluene 87.0 g, methyl methacrylate 11.4 g, lauryl methacrylate 76.4 g, 2,2'-azobis-isobutyronitrile 0.183 g (1.11 mmol), and 1-dodecanethiol 0.345 g (1.71 mmol) were added at room temperature. Successively, the reacted solution in the reaction vessel was bubbled for 30 minutes with nitrogen, and thereafter stirred and polymerized for 24 hours at 60° C. The reacted solution obtained was poured into a beaker containing 1 L of methanol and a precipitate was obtained. The precipitate was dried in a vacuum for 24 hours at 60° C. and a liquid product 76.9 g was obtained. The product was referred to as "polymer B2."

As a result of subjecting the polymer B2 to $^1$H-NMR measurement and GPC measurement, it was clarified that: the polymer B2 was a random copolymer of poly(methyl methacrylate-co-poly lauryl methacrylate); Mn thereof was 37,800, Mw thereof was 63,500, and thus Mw/Mn thereof was 1.68; and the ratio of the methyl methacrylate unit to the lauryl methacrylate unit was 12.5 to 87.5 (mass %).

Example 1

With regard to a lubricating oil composition produced by mixing and conditioning 2.5 g of the polymer A1 obtained in Synthesis example 1 and 47.5 g of a mineral oil (COSMO NEUTRAL 100), the dynamic viscosity was measured and the viscosity index was calculated. The results are shown in Table 1. Further, the viscosity was measured and the specific viscosity and the E value were obtained. The results are shown in Table 2.

Example 2

With regard to a lubricating oil composition produced by mixing and conditioning 2.5 g of the polymer A2 obtained in Synthesis example 2 and 47.5 g of a mineral oil (COSMO NEUTRAL 100), the dynamic viscosity was measured and the viscosity index was calculated. The results are shown in Table 1.

Example 3

With regard to a lubricating oil composition produced by mixing and conditioning 2.5 g of the polymer A3 obtained in Synthesis example 3 and 47.5 g of a mineral oil (COSMO NEUTRAL 100), the dynamic viscosity was measured and the viscosity index was calculated. The results are shown in Table 1.

Example 4

With regard to a lubricating oil composition produced by mixing and conditioning 2.5 g of the polymer A4 obtained in Synthesis example 4 and 47.5 g of a mineral oil (COSMO NEUTRAL 100), the dynamic viscosity was measured and the viscosity index was calculated. The results are shown in Table 1. Further, the viscosity was measured and the specific viscosity and the E value were obtained. The results are shown in Table 2.

Example 5

With regard to a lubricating oil composition produced by mixing and conditioning 0.5 g of the polymer A4 obtained in Synthesis example 4 and 49.5 g of a mineral oil (COSMO NEUTRAL 100), the viscosity was measured and the specific viscosity and the E value were obtained. The results are shown in Table 2.

Example 6

With regard to a lubricating oil composition produced by mixing and conditioning 0.5 g of the polymer A5 obtained in Synthesis example 5 and 49.5 g of a mineral oil (COSMO NEUTRAL 100), the viscosity was measured and the specific viscosity and the E value were obtained. The results are shown in Table 2.

Comparative Example 1

With regard to a mineral oil (COSMO NEUTRAL 100), the dynamic viscosity was measured and the viscosity index was calculated. The results are shown in Table 1. Further, the viscosity was measured and the specific viscosity and the E value were obtained. The results are shown in Table 2.

Comparative Example 2

With regard to a lubricating oil composition produced by mixing and conditioning 5 g of the polymer B1 obtained in Comparative synthesis example 1 and 95 g of a mineral oil (COSMO NEUTRAL 100), the dynamic viscosity was measured and the viscosity index was calculated. The results are shown in Table 1.

Comparative Example 3

With regard to a lubricating oil composition produced by mixing and conditioning 5 g of the polymer B2 obtained in Comparative synthesis example 2 and 95 g of a mineral oil (COSMO NEUTRAL 100), the dynamic viscosity was measured and the viscosity index was calculated. The results are shown in Table 1. Further, the viscosity was measured and the specific viscosity and the E value were obtained. The results are shown in Table 2.

TABLE 1

| | Composition of lubricating oil composition | | | | Evaluation result | | | |
|---|---|---|---|---|---|---|---|---|
| | | Lubricating oil additive | | | Lubricating oil additive amount | | Dynamic viscosity | Dynamic viscosity | Viscosity |
| | Base oil | Polymer | Mw | Mw/Mn | (mass %) | Solubility | at 40° C. (mm$^2$/s) | at 100° C. (mm$^2$/s) | index |
| Example 1 | COSMO NEUTRAL 100 | A1 | 51,000 | 1.09 | 5 | ○ | 56.70 | 11.70 | 208 |
| Example 2 | COSMO NEUTRAL 100 | A2 | 58,800 | 1.06 | 5 | ○ | 54.48 | 10.13 | 176 |
| Example 3 | COSMO NEUTRAL 100 | A3 | 61,400 | 1.13 | 5 | ○ | 55.87 | 12.10 | 220 |
| Example 4 | COSMO NEUTRAL 100 | A4 | 115,000 | 1.19 | 5 | ○ | 176.40 | 48.12 | 423 |
| Comparative example 1 | COSMO NEUTRAL 100 | Nil | — | — | 0 | — | 21.79 | 4.29 | 102 |
| Comparative example 2 | COSMO NEUTRAL 100 | B1 | 59,400 | 1.72 | 5 | ○ | 36.94 | 7.46 | 174 |
| Comparative example 3 | COSMO NEUTRAL 100 | B2 | 63,500 | 1.68 | 5 | ○ | 36.17 | 7.49 | 181 |

TABLE 2

| | Composition of lubricating oil composition | | | | Lubricating oil additive amount (mass %) | Evaluation result | |
|---|---|---|---|---|---|---|---|
| | | Lubricating oil additive | | | | | Viscosity at 0° C. (mPa·s) |
| | Base oil | Polymer | Mw | Mw/Mn | | Solubility | |
| Example 1 | COSMO NEUTRAL 100 | A1 | 51,000 | 1.09 | 5 | ○ | 493 |
| Example 4 | COSMO NEUTRAL 100 | A4 | 115,000 | 1.19 | 5 | ○ | 870 |
| Example 5 | COSMO NEUTRAL 100 | A4 | 115,000 | 1.19 | 1 | ○ | 215 |
| Example 6 | COSMO NEUTRAL 100 | A5 | 63,300 | 1.05 | 1 | ○ | 186 |
| Comparative example 1 | COSMO NEUTRAL 100 | Nil | — | — | 0 | — | 166 |
| Comparative example 3 | COSMO NEUTRAL 100 | B2 | 63,500 | 1.68 | 5 | ○ | 333 |

| | Evaluation result | | | | | | |
|---|---|---|---|---|---|---|---|
| | Viscosity at 40° C. (mPa·s) | Viscosity at 70° C. (mPa·s) | Specific viscosity at 0° C. | Specific viscosity at 40° C. | Specific viscosity at 70° C. | E value (40° C./0° C.) | E value (70° C./40° C.) |
| Example 1 | 58.7 | 23.2 | 1.96 | 2.08 | 2.07 | 1.06 | 1.00 |
| Example 4 | 190 | 82.3 | 4.23 | 8.94 | 9.89 | 2.11 | 1.11 |
| Example 5 | 26.9 | 10.3 | 0.26 | 0.41 | 0.37 | 1.55 | 0.90 |
| Example 6 | 23.0 | 9.5 | 0.12 | 0.20 | 0.26 | 1.71 | 1.28 |
| Comparative example 1 | 19.1 | 7.6 | — | — | — | — | — |
| Comparative example 3 | 36.9 | 14.3 | 1.00 | 0.93 | 0.89 | 0.93 | 0.96 |

From the results shown in Table 1, it is understood that each of Examples 1 to 4: is the case of a lubricating oil additive comprising a block copolymer composed of a polymer block comprising a (meth)acrylic acid alkyl ester unit having a $C_{1-3}$ alkyl group and a polymer block comprising a (meth)acrylic acid alkyl ester unit having a $C_{4-30}$ alkyl group; and has particularly high thickening effect and viscosity index improving capability in comparison with an acrylic polymer (Comparative examples 2 and 3) having a molecular weight distribution of 1.5 or larger. As a result, it also becomes possible to reduce the addition amount of a lubricating oil additive.

Further, as it is obvious from the results shown in Table 2, a lubricating oil additive comprising an acrylic block copolymer of the present invention shown in each of Examples 1 and 4 to 6 has the feature in that the specific viscosity increases as the temperature rises in comparison with an acrylic polymer (Comparative example 3) having a molecular weight distribution of 1.5 or larger. That shows that the thickening effect is smaller at a low temperature than at a high temperature and it can be said that the lubricating oil additive is excellent in viscosity characteristics at a low temperature.

INDUSTRIAL APPLICABILITY

A lubricating oil additive according to the present invention: can improve the viscosity index of a lubricating oil with a small addition amount in comparison with a conventional acrylic lubricating oil additive; and moreover, can improve the low temperature characteristics, flow characteristics, and shear stability. Further, by using a lubricating oil composition containing a lubricating oil additive according to the present invention, it is possible to save energy with the lubricating oil, extend the service life of the lubricating oil, and reduce the load on global environment.

The invention claimed is:
1. A lubricating oil additive comprising at least one acrylic block copolymer having a weight-average molecular weight of 10,000 to 1,000,000 and a molecular weight distribution (ratio (Mw/Mn) of a weight-average molecular weight (Mw) to a number-average molecular weight (Mn)) of 1.3 or below, wherein the block copolymer comprises (meth)acrylic acid alkyl ester units consisting of (meth)acrylic acid alkyl ester units having a $C_{1-3}$ alkyl group as polymer block A and (meth)acrylic acid alkyl ester units selected from the group consisting of n-butyl methacrylate, isobutyl methacrylate, sec-butyl methacrylate, t-butyl methacrylate, n-hexyl methacrylate, cyclohexyl methacrylate, 2-ethylhexyl methacrylate, dodecyl methacrylate, lauryl methacrylate, n-butyl acrylate, isobutyl acrylate, sec-butyl acrylate, t-butyl acrylate, n-hexyl acrylate, cyclohexyl acrylate, 2-ethylhexyl acrylate, lauryl acrylate, and tridecyl acrylate as polymer block B; and the block copolymer has at least one kind of a structure selected from the group consisting of $(A-B)_a$, $(A-B)_b-A$, and $(B-A)_c-B$, wherein a, b, and c independently represent an integer of 1 to 10.

2. The lubricating oil additive according to claim 1, wherein a mass ratio A/B of the total mass of the polymer block represented by A to the total mass of the polymer block represented by B is 1/99 to 40/60.

3. The lubricating oil additive according to claim 1, wherein polymer block A comprises a methacrylic acid alkyl ester unit having a $C_{1-3}$ alkyl group and polymer block B comprises an acrylic acid alkyl ester unit selected from the group consisting of n-butyl acrylate, isobutyl acrylate, sec-butyl acrylate, t-butyl acrylate, n-hexyl acrylate, cyclohexyl acrylate, 2-ethylhexyl acrylate, lauryl acrylate, and tridecyl acrylate.

4. The lubricating oil additive according to claim 1, wherein the acrylic block copolymer is a polymer produced by an anionic polymerization method or an atom transfer radical polymerization method.

5. The lubricating oil additive according to claim 1, wherein the acrylic block copolymer is a polymer produced by an anionic polymerization method in the presence of an organic aluminum compound.

6. A lubricating oil composition containing the lubricating oil additive according to claim 1.

7. The lubricating oil additive according to claim 1, wherein the molecular weight distribution of the block copolymer is 1.2 or below.

8. The lubricating oil additive according to claim 1, wherein a mass ratio A/B of the total mass of the polymer block represented by A to the total mass of the polymer block represented by B is 5/95 to 25/75.

9. The lubricating oil additive according to claim 1, wherein polymer block A consists of methyl methacrylate.

10. The lubricating oil additive according to claim 1, wherein polymer block B consists of lauryl methacrylate or 2-ethylhexyl acrylate.

* * * * *